METHOD FOR PRODUCING ULTRAFINE GRAINED STEEL
Original Filed June 3, 1963
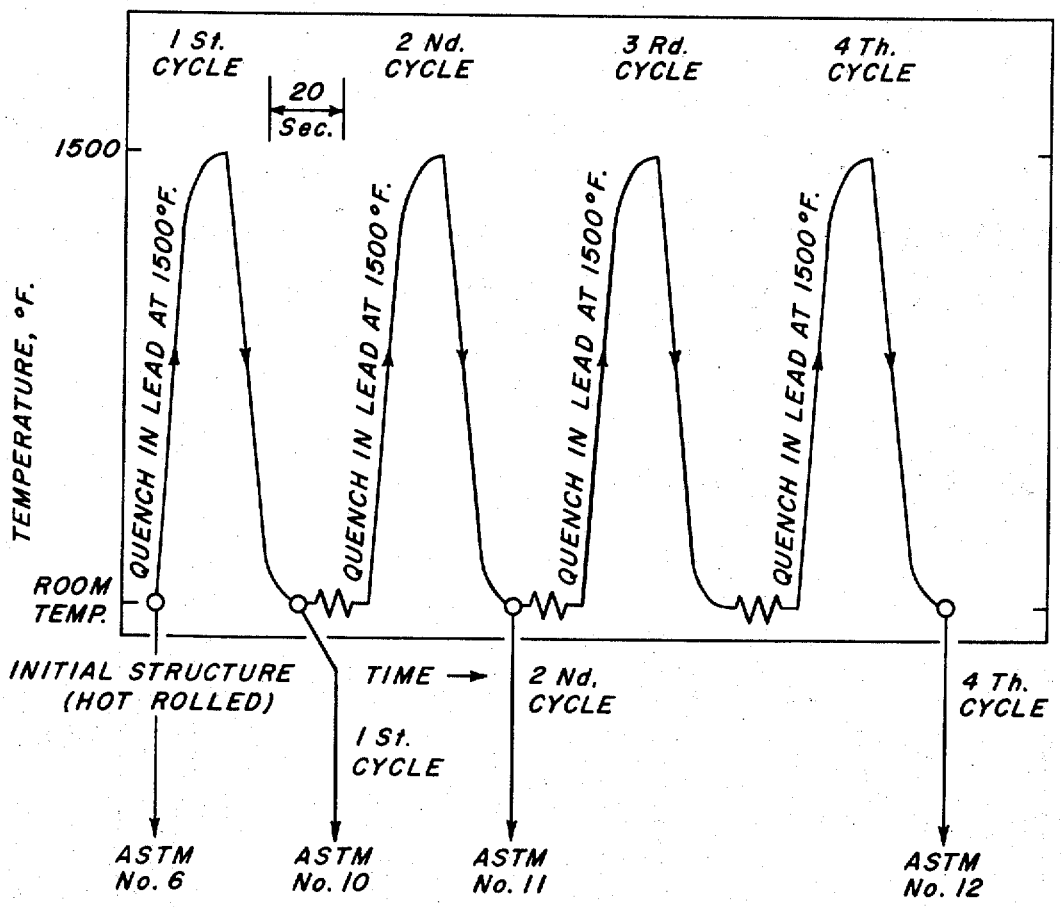
INVENTORS.
RAYMOND A. GRANGE and
EDWARD R. SHACKELFORD
By Donald G. Dalton
Attorney United States Patent Office Re. 27,505
Reissued Oct. 10, 1972

27,505
METHOD FOR PRODUCING ULTRAFINE GRAINED STEEL

Raymond A. Grange, Washington Township, Westmoreland County, Pa., and Edward R. Shackelford, Chicago, Ill., by United States Steel Corporation, assignee Original No. 3,178,324, dated Apr. 13, 1965, Ser. No. 285,121, June 3, 1963. Application for reissue Jan. 14, 1971, Ser. No. 106,598
Int. Cl. C21d *1/18*
U.S. Cl. 148—143 2 Claims

Matter enclosed in heavy brackets [ ] appears in the original patent but forms no part of this reissue specification; matter printed in italics indicates the additions made by reissue.

ABSTRACT OF THE DISCLOSURE

*A method of producing ultrafine grain size in steel comprising cyclically treating such steel by heating it at least twice to above its $Ac_3$ temperature but below the temperature at which austenite grains coarsen rapidly for just sufficient time to transform it to an austenitic structure and then before any appreciable grain growth occurs quickly cooling it to transform the austenite in all but the last cycle to a microstructure of the class consisting of martensite, bainite or mixtures and in the last cycle cooling at a rate which will produce the desired microstructure whereby an austenite grain size finer than ASTM #10 is produced therein.*

This invention relates to the production of ultrafine grained steel and more particularly to the production of ultrafine grain size in steel by heat treatment.

The desirability of fine grain size in steel has long been recognized because of its effect on the strength, ductility and other mechanical properties of steel. Heretofore fine grain has only been obtainable by steel production techniques such as by deoxidizing with silicon and aluminum or the addition of grain refining elements such as vanadium or columbium. Steels containing aluminum, vanadium, columbium and other grain refining elements in sufficient amounts to refine the grains are fine grained and resist grain coarsening in that they can be heated well above the $Ac_3$ temperature for considerable time. However, the use of such elements adds to the expense of the steels and particularly in the case of aluminum results in a killed steel so that hot topping practice is required. Moreover the obtaining of fine grain in such manner precludes the obtaining of a relatively pure rim portion such as results from a full rimming action. Applicants have discovered that it is possible to produce even finer grains than is conventionally obtained with deoxidizing or grain refining elements by suitable heat treatment alone. The fine grain so produced is finer than #10 on the ASTM grain size chart and may accordingly be termed ultrafine grained.

Thus it is an object of the present invention to obviate the necessity of using deoxidizing or grain refining elements in the production of fine grained steels.

Another object is to produce an ultrafine grained condition in steel by heat treatment following forging or rolling the steel to the desired shape or gauge.

The foregoing and further objects will be apparent from the following specification when read in conjunction with the attached drawing illustrating the teaching of the invention as applied to SAE 1045 steel.

We have discovered that an ultrafine grain size can be produced in steel by a multicycle heat treatment consisting of rapidly heating the steel in less than 60 seconds to a temperature above the [$Ac_1$] $Ac_3$ to convert ferrite to austenite but below the temperature at which austenite grains coarsen rapidly and as soon thereafter as possible cooling it before the austenite grains so formed can grow appreciably. The cooling in all but the last cycle must be sufficiently fast to develop a structure of the class consisting of bainite, martensite or mixtures thereof and thus avoid transformation to a ferrite-pearlite microstructure. In the last cycle, air cooling, which develops a ferrite-pearlite microstructure, may be used if desired. Preferably the steel is not heated more than 150° F. above its [$Ac_1$] $Ac_3$ temperature. In some steels two such cycles will produce substantially the finest grains possible although in others continued refinement may result by repeating the cycle three or more times. The optimum number of cycles varies among steels of different compositions depending primarily upon the nature of the initial and intermediate metallographic structures developed by cooling after each cycle.

The steels suitable for grain refinement by this process are all those which are hardenable by heat treatment, are predominantly ferritic rather than austenitic at room temperature, and become completely austenitic on heating to a suitable elevated temperature. This excludes only high-alloy steels such as austenitic or ferritic stainless steels. At room temperature, steels responsive to our process consist of martensite or of carbides in a matrix of ferrite. When heated into the critical range, ferrite begins to transform into austenite by a nucleation and growth process. Ferrite grain boundaries are preferred nucleation sites for austenite, and furthermore there is a strong tendency for austenite once nucleated to grow until it has consumed the particular ferrite grain in which it nucleated and then to cease growing for a time. Thus, as steel is heated into its critical range, austenite grains assume the shape and size of the prior ferrite grains. However, this is only a temporary situation because growth of the austenite grains is also occurring, by which process more stable grains consume adjacent less stable grains. If the heating rate is relatively fast, the austenite grain growth process is slower than the ferrite to austenite transformation. This makes it possible to retain in the final product an austenite grain size closely related to the prior ferrite grain size by rapidly heating to a temperature just sufficiently above the critical range to austenitize the steel and then cooling immediately. The resulting ferrite grain size is smaller than the parent austenite grain size. Thus, heating rapidly so as to expose austenite to temperatures above the critical range for a time barely sufficient to convert all ferrite to austenite and cooling quickly results in refinement of grain size. Furthermore, repeating this short heating cycle produces additional grain refinement because at the start of the second cycle the ferrite grain size is smaller than at the start of the first cycle. Thus, mulicycle rapid heating leads to progressive grain refinement. After a certain number of cycles, depending on the particular steel and specific heating cycle, no additional grain refinement is produced, however, because growth occurs more and more rapidly as austenite grains are made ever finer on successive heating cycles until eventually a stalemate is reached.

It requires at least two cycles to obtain the maximum grain refinement and about four cycles will almost always develop the maximum refinement. The number of cycles to produce such result varies depending primarily upon steel composition and upon the nature of the initial and intermediate metallographic structures developed by cooling after each cycle.

In practicing our invention, it is necessary that the heating be done quite rapidly but once the desired rate is obtained on further advantage results from exceeding such rate by extremely fast heating. In thicknesses up to 0.5 inch, satisfactory results can be obtained by lead-bath heating but other types of liquid baths, such as salts, or electrical induction or resistance heating may be used. The heating time should be less than 60 seconds and preferably less than 20 seconds. In such thicknesses as .03 to .50 inch, the same ultrafine grain size was obtained upon heating in a lead bath from 10 to 20 seconds.

While the treatment may involve cooling to room temperature after austenitizing, it is only essential to cool sufficiently to insure transformation of the austenite to bainite, martensite or mixtures thereof and avoid the formation of ferrite-pearlite on all cycles except possibly the last. The cooling may be done in any convenient manner but must be sufficiently rapid to minimize austenite grain growth at temperatures above the critical range. Thus for thin sections air quenching will suffice but heavier sections will require water or other liquid quenching. After the final heating cycle, the steel should be cooled at a rate which develops the desired metallographic structure for the intended use of the product. No additional heat treatment other than subcritical tempering or annealing should be used thereafter because the ultrafine grain achieved by the treatment may be wholly or partially lost.

The single figure of the drawing illustrates schematically a four-cycle treatment showing the degree of grain refinement obtained by one, two and four cycles in comparison with the hot rolled structure. The steel used in obtaining the data for the figure was SAE 1045 which had been hot rolled to 0.150-inch-thick strip. Heating was accomplished by immersing in a lead bath maintained at 1500-F. for 20 seconds.

The [$Ac_1$] $Ac_3$ temperature of this steel is 1420° F. As shown, an ultrafine grain size of #11 ASTM was obtained in two cycles, with slightly finer grain resulting from two additional cycles. No appreciable improvement was obtained by additional cycles beyond the four shown. In the cyclic treatment of FIGURE 1, the specimens were oil quenched after the first cycle of the two-cycle specimen and after the first, second and third cycle of the four-cycle specimen. The final cooling in each case was air cooling.

The following Table I gives data obtained from treating representative hypoeutectoid steels in accordance with the invention. This table compares the grain size obtained by one, two, and four cycles with that obtained by the indicated conventional austenitizing treatment. The medium carbon steels often developed the full improvement in grain size with two cycles but the low carbon steels required more than two cycles to do so. The difficulty in developing full grain refinement in low carbon steels is believed to result from their higher [$Ac_1$] $Ac_3$ temperature whereby they must be heated to higher temperatures to austenitize them.

TABLE I

Grain refinement in hypoeutectoid steels

| Grade SAE No. | Austenite grain size, ASTM No. | | | |
|---|---|---|---|---|
| | Conventional [1] austenitizing | Rapid heating [2] | | |
| | | 1 cycle | 2 cycles | 4 cycles |
| 1015 | 9½ | 10 | 11½ | 12 |
| 1335 | 8½ | 13 | 14 | 14 |
| 4035 | 10 | 13½ | 14½ | 14½ |
| 4140 | 11 | 12½ | 14 | 14 |
| 4315 | 10 | 9 | 11½ | 13 |
| 4340 | 10½ | 13 | 13½ | 14 |
| 8140 | 10 | 12½ | 13½ | 13½ |

[1] Heated in air for 20 minutes at 1,550° F. (except 1,600° F. for 1015 and 4315).
[2] Heated in lead for 10 seconds at 1,550° F. (except 1,600° F. for 1015 and 4315).

NOTE.—All steels heat treated in form of hot-rolled 0.100-inch-thick strip.

The following Table II gives data obtained from treating high carbon steels pursuant to the invention. If such steels are heated sufficiently high to dissolve all the carbides, very little grain refinement can be obtained. However, a high degree of grain refinement can be obtained if the heating temperature is too low to dissolve all the carbides. Since for many uses solution of all carbides in high carbon steels is not required or desirable such steels can in many cases be advantageously treated to produce ultrafine grain size.

TABLE II

Grain refinement in hypereutectoid steels

| Grade SAE No. | Heating temp., ° F.[1] | Austenite grain size, ASTM No. | | | |
|---|---|---|---|---|---|
| | | 1 cycle | 2 cycles | 4 cycles | Undissolved carbides |
| 1085 | 1,550 | 10 | 10½ | 11 | None. |
| | 1,500 | 11 | 11½ | 12 | Trace. |
| | 1,450 | 15½ | 16 | 16 | Many. |
| 4360 | 1,550 | 10½ | 13½ | 13½ | Few. |
| | 1,500 | 10 | 14 | 16 | Many. |
| 4380 | 1,500 | 10 | 14½ | 17 | Do. |

[1] Heated for 10 seconds in lead.

NOTE.—Specimens were 0.100-inch-thick strip.

As indicated hereinabove the optimum heating temperature and time may vary with steel composition but generally the optimum temperature will be about the same as that conventionally used for austenitizing each steel. While the maximum grain refinement is generally obtained in two to four cycles, further cycles may in some cases be required particularly with hypereutectoid steels wherein the dispersion of small undissolved carbide particles developed minimizes grain growth.

The following Table III shows that the type of deoxidation has little, if any, effect on the grain size obtained by practicing the invention. Thus in the case of 0.1-inch-thick specimens of 1045 steels tested, steel produced by coarse-grain practice, i.e., silicon-killed had the same fine grain size #14 ASTM after four cycles as a steel produced to fine grain practice, i.e., killed with silicon and aluminum.

TABLE III

Effect of mode of deoxidation in response to short-cycle heating

| Deoxidation practice | Heating cycle | Number of cycles | Austenite grain size | |
|---|---|---|---|---|
| | | | Mean grain diam., microns | ASTM number |
| Coarse-grained | 1,500° F. 8 sec | 2 | 3.9 | 13.1 |
| ASTM #2 to 4 [1] | 1,500° F. 3 sec | 4 | 2.8 | 14.0 |
| Fine-grained | 1,500° F. 8 sec | 2 | 3.3 | 13.5 |
| ASTM #6 to 8 [1] | 1,500° F. 8 sec | 4 | 2.8 | 14.0 |

[1] McQuaid-Ehn Test.

Due to the ultrafine grain size, steels treated in accordance with this invention have better toughness, ductility and yield strength than conventionally heat treated steels. This is shown by the following Table IV.

TABLE IV
Mechanical properties
[AISI 1045—0.23-inch thick strip]

| Heat treatment | Asutenite grain size | Tensile strength, p.s.i. | Yield strength, p.s.i. | Elong. in 1", percent | Reduction of area, percent | Notch [1] toughness ft./lb. at 25° F. |
|---|---|---|---|---|---|---|
| Conventional Normalize (1,550° F. air cool). | #8 ASTM | 101,900 | 64,100 | 28 | 57 | 11 |
| Cyclical Rapid Heating | #12 ASTM | 99,200 | 73,200 | 30.5 | 61.5 | 20 |

[1] V-Notch Charpy Impact Test; average of three half-width specimens.

While we have shown and described several specific embodiments of our invention, it will be understood that these embodiments are merely for the purpose of illustration and descrciption and that various other forms may be devised within the scope of our invention, as defined in the appended claims.

We claim:

1. A method of producing ultrafine grain size in steel which is predominately ferritic rather than austenitic at room temperature, becomes completely austenitic on heating to suitable elevated temperature and thereafter becomes ferritic on cooling to room temperature comprising cyclically treating such steel by heating it at least twice to above its [$Ac_1$] $Ac_3$ temperature but below the temperature at which austenite grains coarsen rapidly for just sufficient time to transform it to an austenitic structure and then before any appreciable grain growth occurs quickly cooling it to transform the austenite in all but the last cycle to a microstructure of the class consisting of martensite, bainite or mixtures thereof and in the last cycle cooling at a rate which will produce the desired microstructure whereby an austenite grain size finer than ASTM #10 is produced therein.

2. A method of producing ultrafine grain size in steel which is predominately ferritic rather than austenitic at room temperature, becomes completely austenitic on heating to suitable elevated temperature and thereafter becomes ferritic on cooling to room temperature comprising cyclically treating such steel by heating it at least twice in less than 60 seconds to above its [$Ac_1$] $Ac_3$ temperature but not more than 150° F. thereabove for just sufficient time to transform it to an austenitic structure and then before any appreciable grain growth occurs quickly cooling to transform the austenite in all but the last cycle to a microstructure of the class consisting of martensite, bainite or mixtures thereof and in the last cycle cooling at a rate which will produce the desired microstructure whereby an austenite grain size finer than ASTM #10 is produced therein.

References Cited

The following references, cited by the Examiner, are of record in the patented file of this patent or the original patent.

UNITED STATES PATENTS 1,919,983 7/1933 Morrill ---------- 148—144

OTHER REFERENCES

Principles of Heat Treatment, by M. A. Grossmann, published by the A.S.M. (1935), p. 203 relied upon.

RICHARD O. DEAN, Primary Examiner

U.S. Cl. X.R.

148—134, 144